United States Patent
Messager et al.

(10) Patent No.: US 7,348,036 B2
(45) Date of Patent: Mar. 25, 2008

(54) FLOURS AND STARCH WITH A VERY HIGH AMYLOPECTIN CONTENT AND METHODS FOR THE PRODUCTION AND USES THEREOF

(75) Inventors: Arnaud Messager, Riom (FR); Denis Despre, Riom (FR)

(73) Assignee: Ulice S.A. (FR)

( * ) Notice: Subject to any disclaimer, the term of this patent is extended or adjusted under 35 U.S.C. 154(b) by 0 days.

(21) Appl. No.: 09/961,914

(22) Filed: Sep. 24, 2001

(65) Prior Publication Data

US 2002/0037352 A1 Mar. 28, 2002

Related U.S. Application Data

(63) Continuation of application No. PCT/FR00/00808, filed on Mar. 30, 2000.

(51) Int. Cl.
*A21D 6/00* (2006.01)
(52) U.S. Cl. ............... 426/622; 426/506; 426/507; 426/508; 426/615
(58) Field of Classification Search ........ 426/615, 426/618, 506, 507, 508
See application file for complete search history.

(56) References Cited

U.S. PATENT DOCUMENTS

| | | | | |
|---|---|---|---|---|
| 3,904,429 A | * | 9/1975 | Eastman et al. ............ 127/71 |
| 4,540,592 A | * | 9/1985 | Myer et al. ............... 426/557 |
| 5,562,937 A | * | 10/1996 | Senkeleski et al. .......... 426/48 |
| 6,042,867 A | * | 3/2000 | Hoshino et al. ........... 426/622 |
| 6,143,963 A | * | 11/2000 | Keeling et al. ......... 800/320.3 |
| 6,410,075 B1 | * | 6/2002 | Dudacek et al. ........... 426/578 |

FOREIGN PATENT DOCUMENTS

| | | |
|---|---|---|
| AU | 1009997 | 7/1997 |
| EP | 0 319 692 A1 | 6/1989 |
| GB | 1085562 | * 10/1967 |
| JP | 55157595 | 12/1980 |
| JP | 08266253 | 10/1996 |
| JP | 09187234 | 7/1997 |
| WO | WO 96/03891 | 2/1996 |

OTHER PUBLICATIONS

Takeshi Yasui et al., *Amylose and Lipid Contents, Amylopectin Structure, and Gelatinisation Properties of Waxy Wheat (Triticum aestivum) Starch*, Journal of Cereal Science, vol. 24, 1996, pp. 131-137.

* cited by examiner

*Primary Examiner*—Lien Tran
(74) *Attorney, Agent, or Firm*—DLA Piper US LLP

(57) ABSTRACT

A full waxy wheat flour or starch characterized in that its amylose content is about 0%±about 1%, and a process for preparing a functional full waxy wheat flour including preparing an initial flour with a defined size grading starting from full waxy wheat grains, and subjecting the flour to a heat-moisture treatment including adding water or steam and heat energy to achieve a degree of gelatinization of starch between about 15 and about 99% for less than about 5 minutes.

4 Claims, 6 Drawing Sheets

FLOURS AND STARCH WITH A VERY HIGH AMYLOPECTIN CONTENT AND METHODS FOR THE PRODUCTION AND USES THEREOF

RELATED APPLICATION

This is a continuation of International Application No. PCT/FR00/00808, with an international filing date of Mar. 30, 2000, which is based on French Patent Application No. 99/04120, filed Mar. 30, 1999.

FIELD OF THE INVENTION

This invention relates to the food domain and applies to products derived from full waxy wheat, particularly full waxy wheat starches, full waxy wheat flours, full waxy wheat starches or flours after being subjected to a heat/moisture treatment (BOW-HT starches or flours) and products containing or prepared from this type of flour or starch.

The invention also relates to a process for obtaining these products, particularly such BOW-HT starches or flours, and their use in starch works for the production of food or non-food products.

BACKGROUND

Wheat is the most widely cultivated cereal and is one of the staple foods for the world's population. It is used to produce wheat flour that is used in the composition of bread, pasta, cereals and many other food products intended for man or animals. It is known that wheat, like all other cereals, is rich in starch and that a change in the quantity or quality of starch affects the flour derived from this wheat.

The flour searched for is flour derived from starch with physical properties such that products containing these flours do not retrograde or become stale.

The starch is in the form of simple or compound insoluble grains or granules with a spherical, lenticular or angular shape and with variable size depending on the species. The composition of a starch granule is complex and different in different species. Firstly it comprises 15 to 20% of water, but also fatty acids (1% in wheat), calcium phosphate (cereals) and potassium phosphate (potatoes) forming part of a mineral residue that can be as much as 0.4% of the fresh weight (wheat starch), and finally proteins, most of which are enzymatic.

Starch in the native state is completely insoluble. When treated in hot water (from 60° C. to 80° C.), starch grains that are insoluble in cold water produce a paste, that is a viscquous liquid that hardens as it dries. Therefore, they contain amylopectin, a mucilaginous substance that causes the viscosity of the paste, and amylose that is precipitated after cooling in the form of a white powder.

Therefore, this heat/moisture treatment causes irreversible swelling of the granules and their solubilization. It is necessary so that the properties, and particularly viscoelasticity, polymerization and retrogradation, can be revealed.

The heat/moisture treatment causes an irreversible modification of the semi-crystalline structure of native starch, which changes from an ordered state to a disordered state, resulting in gelatinization. The gel thus formed is not stable and after a few days the starch restructures itself into a more ordered structure, this phenomenon being known as retrogradation. The fact that bread products become stale and the excessive viscosity of sauces and other products of this type are related to this retrogradation and to another phenomenon called syneresis (exudation of water) responsible for separation of phases and decomposition of the texture of products.

These problems do not arise in traditional cooking, when food is eaten quickly. In this case, unmodified wheat or maize flours are used to thicken a sauce or soup, etc. But problems due to retrogradation occur as soon as it is required to conserve these products, particularly by freezing. The texture of the food can be recovered to a certain extent, but the result is never satisfactory.

These problems occur on a larger scale in the food industry. In that context, food is not intended for immediate consumption. It is essential that it should be conserved as well as possible for as long as possible.

These problems limit the use of starches with a high amylose content, and are one of the reasons for which waxy starches are required.

Some species, and particularly maize, are already known that contain starches composed exclusively of amylopectin derived from waxy mutants. These mutants are in strong demand because they have a limited tendency towards retrogradation, thus guaranteeing a texture that does not change with time.

Waxy mutants are plants in which the synthesis of Granule Bound Starch Synthase (GBSS), also called Wx protein, an essential enzyme for the synthesis of amylose, is inhibited, or plants that synthesize inactive GBSS. Most waxy starches are derived from diploid plants such as barley, maize, rice or potatoes.

The techniques used to obtain waxy starch are more adapted to diploid plants. For example, mutageneous treatment using X-rays or ethyl-methane-sulphonate are very suitable for diploid plants, but are inefficient on tetra or hexaploid plants which do not express recessive mutation. Therefore, it is more difficult to obtain waxy mutants starting from polyploid plants considering the presence of several isoenzymes that take part in the synthesis of amylose.

Thus, wheat is polyploid and most wheat varieties are hexaploid, with three groups of seven pairs of chromosomes. There are three coding genes for three isoforms of GBSS, Wx-A1, Wx-B1 and Wx-D1. These three isoforms of GBSS may be separated as a function of their molecular weight. Furthermore, they have different structural, chemical and biochemical properties.

A few varieties of natural "partial waxy" wheat have been identified in which one or two of the iso-enzymes are inactive or missing. Starches derived from this wheat are also called "partial waxy". The concentration in amylose in these "partial waxy" starches is low and variable, but it is not zero, and in some cases the content of amylose remains almost unchanged by a compensation phenomenon.

On the other hand, the existence of a natural full waxy mutant is very improbable, since a recessive mutation would be necessary on each of the three loci.

One selection method was developed and described to obtain full waxy hexaploid wheat (Toshiki Nakamura et al., Mol Gen Genet, 1995, No. 248, p. 253-259). It consists of crossing a variety of partial waxy hexaploid wheat mutated on the A and B genes, Kanto 107, and a "partial waxy" hexaploid wheat variety mutated on the D gene, Bai Huo. A small percentage of seeds derived from this cross are full waxy and generations originating from these seeds have the full waxy phenotype.

The method used to obtain products according to this invention also consists of crossing two varieties of hexaploid wheat, one being an aabbDD double mutant and the other mutant on the D genome, AABBdd but adapted to western farming. The main varieties mutated on one of the genes involved belong to varieties not adapted to western farming, either because they are very old and very large varieties with a low potential yield, or because they are varieties from other countries that adapt poorly to western conditions. There are several aabbDD type varieties in the West, for example IKE and ROSELLA.

It would be expected that products originating from full waxy wheat would have an undesirably low viscosity and elastic texture. This preconception is perpetuated and disseminated particularly in Canadian patent application No. 2 194 944 in which waxy wheat flours are only used mixed with traditional flours to obtain a satisfactory product.

SUMMARY OF THE INVENTION

This invention relates to a full waxy wheat flour or starch characterized in that its amylose content is about 0%±about 1%.

This invention also relates to a process for preparing a functional full waxy wheat flour including preparing an initial flour with a defined size grading starting from full waxy wheat grains, and subjecting the flour to a heat-moisture treatment including adding water or steam and heat energy to achieve a degree of gelatinization of starch between about 15 and about 99% for less than about 5 minutes.

BRIEF DESCRIPTION OF THE INVENTION

Other examples and advantages of the invention are shown in the following examples, particularly concerning the use of full waxy wheat flours and/or starches, the process according to the invention and the BOW-HT flours and starches obtained and their uses. The following text refers to the drawings in which.

DETAILED DESCRIPTION

Figure 1:
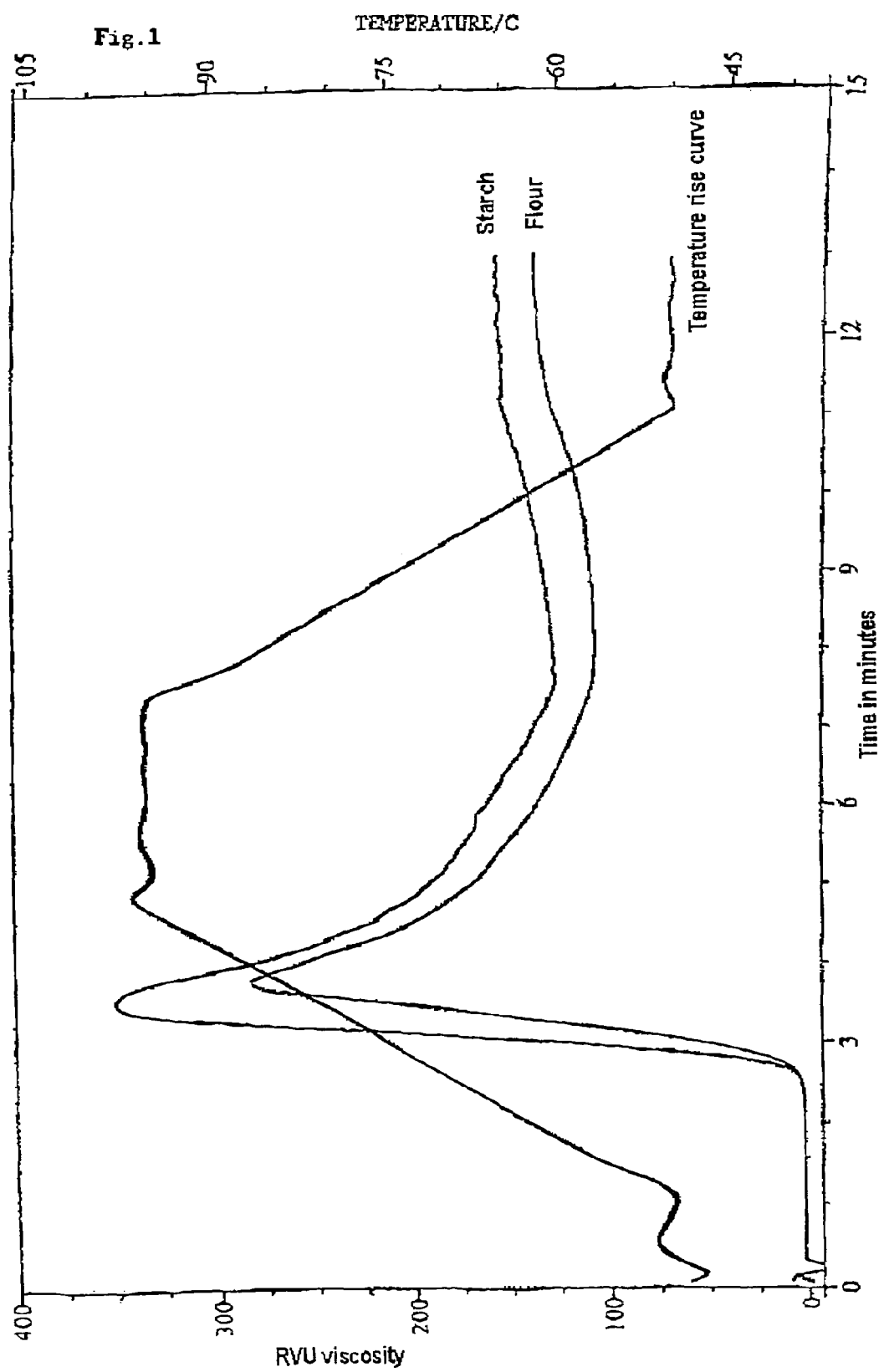
FIG. 1 is a graph showing the RVA viscosity curves for full waxy wheat flour and starch.

It will be appreciated that the following description is intended to refer to specific embodiments of the invention selected for illustration in the drawings and is not intended to define or limit the invention, other than in the appended claims.

Unexpectedly, products derived from full waxy wheat according to this invention all have specific characteristics particularly suitable for food and non-food products that tend to retrograde without the need to mix them with products originating from traditional wheat. Therefore, this invention relates to the use of products derived from full waxy wheat, particularly full waxy wheat flours, full waxy wheat starches, full waxy wheat grains.

Flour, starch, grain or product derived from full waxy wheat refers to flour, starch, grain or a product derived from wheat in which the amylose content of the starch granules is not significant or is zero, in other words is on the order of about 0%±about 1%.

Therefore, this invention provides a full waxy wheat flour or starch that has an insignificant or zero content of amylose, on the order of about 0%±about 1%. The amylose content is determined using the "blue value" method described in an article published in "Starch/Stärker", volume 48, No. 9, p. 338-244, 1996 by the authors Batey Ian et al. and entitled "Measurement of amylose/amylopectin ratio by high performance liquid chromatography", the subject matter of which is incorporated herein by reference.

Full waxy wheat flours according to the invention have a moisture content between about 9 and about 15%, and preferably between about 11 and about 13%, a protein content between about 9 and about 20% and preferably between about 12 and about 16% compared with dry matter.

According to a preferred embodiment of the invention, the moisture content of full waxy wheat flours is about 13% and the protein content is about 15.4%.

The viscosimetric profile of full waxy wheat starch or flour measured by a Rapid Visco-Analyser or RVA (4 g at 14% $H_2O$+24.5 ml of water) has a gelatinization start temperature, or "pasting" start temperature, between about 60° C. and about 80° C., a peak between about 140 and about 600 RVU (RVA unit), a drop in viscosity or "breakdown" between about 0 and about 400 RVU and a final viscosity of between about 0 and about 300 RVU.

According to a preferred embodiment of the invention, the viscosimetric profile of full waxy wheat flour measured by RVA (4 g at 14% $H_2O$+24.5 ml of water) has a gelatinization start temperature equal to 66.15° C., a peak of 284 RVU, a viscosity drop of 177 RVU and a final viscosity of 138 RVU. The viscosimetric profile of full waxy wheat starch measured by RVA (4 g at 14% $H_2O$+24.5 ml of water) has a gelatinization start temperature of 65.3° C., a peak of 351 RVU, a viscosity drop of 224 RVU and a final viscosity of 157 RVU.

For comparison, the final viscosity of a traditional wheat flour is much greater than the constant viscosity due to the retrogradation of starch.

The measured enthalpy for full waxy flour and starch is between about 5 and about 15 J/g, and preferably between about 8 and about 13.

In a preferred embodiment of the invention, the enthalpy for full waxy wheat flour is 10.2 J/g, and it is 12.98 J/g for full waxy starch.

The enthalpy is measured using a Differential Scanning Colorimeter (DSC) with the following protocol:

Packaging: the reference cell contains water (850 mg). A sample of 89 mg is taken, topped up to 850 mg with water. The packaging time (wetting of the sample in the cell closed at ambient temperature) is 1 hour.

Cycle:

DSC SETARAM III micro instrument;

Start temperature 25° C.;

Heating up to 110° C. at a rate of 1.2° C./minute (maximum rate of the instrument);

Cooling to 25° C. at a rate of 3° C./minute.

The analytic results of the products derived from the invention, full waxy starch and wheat, demonstrate that advantageously there is substantially no retrogradation of the flour and starch, due to the lack of amylose. Furthermore, due to the associated proteins and other components, the behavior of flour derived from this wheat is less glary than full waxy wheat starch.

One advantage of the invention is that this full waxy flour and/or starch may be used as such in the food and non-food industry, in other words, without being mixed with traditional wheat flours.

Advantageously, full waxy wheat flours have the advantage that their taste is more neutral and their color is whiter than waxy maize, such that they can be used for more applications. In the food industry, they can be used for the preparation of various products that can be conserved without any change in the texture.

Full waxy starches extracted directly from full waxy wheat or extracted from full waxy wheat flours, are used particularly for conservation of organoleptic neutrality and translucidity.

In the non-food industry, these full waxy wheat starches and/or flours may advantageously be used for cosmetics, paint or glues to increase the cohesion of these products, or as a hydrolysis or fermentation substrate.

The use of full waxy wheat flours and/or starches according to the invention can give:

biscuit products, in which the fele is significantly reduced;

pork butchery products in which the content and texture are improved, which is an advantage for sterilization treatments;

animal feed that has a high water retention and high adhesiveness, which is advantageous for the stability of products;

sauces, cooked dishes and dairy products in which it is required to achieve the same functions such as resistance to technological constraints (shear, acidity, freeze/thaw cycles and heat treatment) as are possible with modified starch, while being able to declare the contents as "INGREDIENTS", with a slight overdose of flour;

"batter" products and other coating products in which the adhesiveness of the breadcrumbs is better and the fele is lower after conservation.

Therefore, an advantage of the invention is the use of a flour or starch defined to make dairy products, biscuit products, sauces, cooked dishes and animal feed.

Other uses of full waxy wheat flours and/or starches according to the invention can also be mentioned:

Hydrolysis substrate (chemical or enzymatic) for the production of malto-dextrines, since they have the advantage of lower hydrolysis times and can improve the production efficiency of malto-dextrines by making them non-retrograding. For example, the malto-dextrines thus obtained can be used for making glues for which in this case it is observed that the viscosity is maintained in time due to non-retrogradation. The malto-dextrines thus obtained can also be used as a fat substitute for food products, for example, mayonnaise. Despite hydrolysis, malto-dextrines derived from traditional wheat always have the disadvantage of retrograding, causing a gradual increase in viscosity during storage, modifying the texture and the appearance of the product. However, malto-dextrines derived from hydrolysis of full waxy flours and/or full waxy starch overcome all these problems and participate in stabilizing the emulsion.

Fermentation substrate in making a farming medium, for a better biomass production yield.

Fermentation substrate in the production of a farming medium for a better production yield of specific metabolites, for example, lactic acid, acetic acid, etc. Surprisingly, full waxy wheat starches and/or flours used as a substrate encourage the growth of micro-organisms (bacteria, yeast) to improve the productivity of specific metabolites.

Therefore, the invention is also applicable to the use of flour or starch defined above as a hydrolysis substrate or as a fermentation substrate to produce malto-dextrines and a fermentation substrate to achieve a better production of biomass and specific metabolites.

The following table summarizes preferred applications of full waxy wheat flours and/or starches according to the invention.

TABLE 1

| Applications of flours and/or starches according to the invention | Functions and advantages |
|---|---|
| Biscuit manufacturing | Reduced fele |
| Sauces and cooked dishes | Lack of retrogradation, lack of syneresis = > conservation |
| Animal feed | Strong water retention, strong adhesiveness |
| Hydrolysis substrate, production of malto-dextrines | Low hydrolysis times, fat substitutes, emulsion stabilizers |
| Fermentation substrate | Increased fermentation = > Better efficiency during production of biomass = > Production of metabolites |

The invention also relates to the use of a flour or starch defined above for the production of non-food products such as cosmetics, glue or paint. Therefore, the invention relates to food products such as biscuits, pork butchery products, animal feed, sauces and cooked dishes, dairy products containing flour and starch as defined above. The invention also relates to a culture medium for micro-organisms or non-food products such as cosmetics, glues and paint containing starch and/or flour as defined above.

The invention also relates to full waxy wheat starch and/or flour obtained by selection of genetic engineering subjected to a prior heat/moisture treatment to significantly improve their functions. Therefore, the invention also relates to a process for preparation of a functional full waxy wheat flour comprising preparation of an initial flour with a defined size grading, starting from full waxy wheat grains, characterized in that the flour is subjected to a heat/moisture treatment including adding water or steam and heat to achieve a degree of gelatinization of the starch between about 15 and about 99%, and preferably between about 20 and about 80% within a very short time, on the order of about 5 minutes. The invention also applies to a flour that can be obtained by this process.

The invention also relates to a process for the preparation of an improved full waxy wheat starch, characterized in that the starch extracted from the full waxy wheat grains is subjected to a heat/moisture treatment including adding water or steam and heat to achieve a degree of gelatinization of the starch between about 15 and about 99%. The invention also relates to a starch that can be obtained by this process.

Full waxy wheat flours and starches that have been subjected to a heat/moisture treatment according to the invention are also sometimes hereinafter referred to as "BOW-HT flours" and "BOW-HT Starches."

Note that most native waxy starches already on the market are derived from maize, and are not used very much in industry due to the elastic and "glary" texture. They are used as a substrate to obtain modified starches by cross linking or stabilization. Cross linking consists of adding chemical bonds to increase the resistance of the granule. Stabilization consists of adding macro-molecules that create interchain repulsions and prevent the reassociation of chains to considerably limit syneresis.

These modified starches have good properties, but they are governed by a specific European regulation controlling use of the term "ADDITIVE" (e.g. E1422), while the labeling declaration for native starch remains "INGREDIENT".

Therefore, another purpose of this invention is to offer a BOW-HT flour or a BOW-HT starch that has properties equivalent to the properties of modified starches for some applications, while being allowed to be included as an INGREDIENT rather than an ADDITIVE in the labeling declaration, which is a remarkable advantage towards how the product is perceived by consumers.

Nevertheless, full waxy wheat starches can also be used as a substrate to obtain modified full waxy wheat starches by cross linking or stabilization.

Full waxy wheat flours and/or starches have considerable advantages, that can be further improved by a specific heat/moisture treatment, thus giving BOW-HT flours or BOW-HT Starches that have a higher degree of functionality enabling them to replace modified starches in some applications. The viscosity achieved with BOW-HT flour is significantly greater than that achieved with full waxy wheat flour that has not been heat treated. The increase in viscosity is kept after cooling and enables use as a higher functional ingredient. The heat treatment is also used to deactivate endogenic activities that can also occur in flours, and mainly the amylose activity. It is also used to limit the glary behavior frequently found, particularly in waxy maize, and to add or highlight new functions such as an increase in viscosity.

Other types of heat treatment are known to experts in the subject. There are two main ways of obtaining two large product classes that are summarized in Table 2 below.

TABLE 2

| | Technology | Function |
|---|---|---|
| Instant products = > for a cold process E.g. instant sauces | = > Pregelatinization (E.g. Extrusion cooking, jet cooker, Drying cylinders, etc.) | Fast increase in viscosity, instant results Good water retention |
| Products to be cooked = > for a hot process E.g. sauce to be cooked | = > Heat/Moisture treatment (corresponding to a heat-moisture treatment) = > annealing (corresponding to a milder and longer heat/moisture treatment) | Partial pregelatinization Improved granular stability Stability under heat and shear |

Thus, a distinction is made firstly between technologies in which the percentage of water used compared with the dry matter (starch or flour) is very high and in which the temperature is very much higher than the gelatinization temperature (for example, a scraped surface exchanger, jet cooker, drying cylinder, extruder cooker). They are used to make "instant" products. These products are heated to a high temperature to gelatinize starches as much as possible. When they are used in a formulation, there is no longer any need for a cooking phase. They are particularly suitable for a cold process, for example, instant soups or sauces.

A distinction also needs to be made between milder technologies intended to partially pregelatinize the starch or to modify its granular structure and improve its stability under shear type and heat treatment type constraints("heat moisture treatment" and "annealing"). When they are applied, a cooking phase is necessary to increase their viscosity.

Tests carried in extrusion cooking were used to produce instant flours based on full waxy wheat flour. A flour for which this treatment was applied has strong adhesion, limiting food applications. On the other hand, they can advantageously be used in animal feed (dry biscuits or pellets) to improve the hardness and durability and, thus, limiting losses during the pelletization process.

As mentioned above, the invention also relates to a full waxy wheat flour and/or starch that has been subjected to a heat treatment according to one of the techniques mentioned above. A preferred process for obtaining this type of flour or wheat according to the invention consists of applying a heat-moisture treatment to a full waxy wheat and/or starch, followed by drying to achieve partial pregelatinization, to modify the crystalline structure of this starch to develop higher viscosities competitive with some modified starches.

The heat-moisture treatment and the drying steps are characterized in that the heat energy necessary to obtain a degree of gelatinization of the starch between about 15 and about 99%, and preferably between about 20 and about 80%, is added to the flour and/or starch in a very short time, and advantageously less than or equal to within about 5 minutes. The heat-moisture treatment and drying steps according to the process are done at temperatures of between about 210° C. and about 250° C. and preferably on the order of about 220° C. for a period of less than about 5 minutes.

Different materials and methods can be applied for the heat/moisture treatment and drying steps according to the process. For example, the extruder cooker gives good degradation of starch, drying drums, jet cooking, scraped surface exchangers, atomization of a starch paste. The preferred technique is usually used to kill bacteria in bran, germs and flours, and to dry and pregelatinize flours, and is based on putting the product into suspension at high turbulence in a heated air current in permanent contact with a surface that is also heated.

A device for the use of this technique comprises two parts, a cooker and a dryer, each composed of a substantially horizontal cylinder in which a horizontal fan keeps the product in contact with the walls by centrifuging. A thermal oil circuit heats the cylinders using a coaxial blanket. The cooker may be provided with steam and/or water and various other additives. Thus, the rheological properties (viscosity, absorption capacity, etc.) of starch are no longer the same, under the effect of moisture combined with the addition of heat energy. The product is then transferred into the dryer, in which air heated through a heat exchanger is injected into the cylinder. The product is then dried by conduction (heated walls) and by convection (heated air). The main parameters to be regulated are the material and water flows, the residence time and the temperatures used.

Therefore, the heat-moisture treatment step followed by the drying step in the process according to the invention are advantageously performed by putting the flour and/or starch into suspension at high turbulence in a heated air current in permanent contact with a surface that is also heated, while adding water or steam.

Therefore, the invention is also related to BOW-HT flours and/or starches. They are remarkable since their coloring is not modified by the treatment, due to enzymatic inactivation and remarkable properties making them competitive with native starches and modified starches for some applications.

The BOW-HT flours obtained have the following characteristics:

Moisture content: about 3 to about 12%

Protein (%/dry matter): about 10 to about 16%

The degree of gelatinization depends on the intensity of the heat treatment and is between about 15 and about 99% and preferably between about 20 and about 80%.

According to a preferred embodiment of the invention, the viscosimetric profile of BOW-HT flour measured by RVA (4 g at 14% $H_2O$+24.5 ml of water) has a gelatinization start temperature equal to 64.55° C., a peak of 479 RVU, a viscosity drop of 309 RVU and a final viscosity of 223 RVU.

In a preferred embodiment of the invention, the enthalpy measured by DSC for the BOW-HT flour according to the protocol described above is 7.7 J/g.

BOW-HT wheat flours and/or starch may be used in the food industry. These flours and/or starches have excellent viscosifying and binding properties without retrogradation during cooling.

Surprisingly, BOW-HT wheat flours and/or starches participate in stabilizing emulsions, particularly emulsified sauces, pork butchery products, etc.

They also have a limited syneresis due to the lack of gelification due to the absence of amylose, excellent behavior with regard to the temperature, low pH values and low shear levels. Due to the fact that they form a wheat basic ingredient, BOW-HT flours and/or starches do not add any color or parasite taste.

Therefore, they may be used as substitutes for native starches or modified starches, depending on the application. Their advantages are listed in Table 3 below for different applications.

TABLE 3

| Applications of flours and starches according to the invention | Functions and advantages |
|---|---|
| Snacks and other extruded products | Increased expansion Improved melting and organoleptic perception |
| Sauces and cooked dishes | No retrogradation, no syneresis Improved texture and organoleptic perception |
| Dairy and desert products | Viscosity and resistance to technological constraints and lack of syneresis |
| Pork butchery and animal feed | Improved resistance and texture Better water retention, increased technological yield |
| Panification and croissants and buns | Improved aeration, increased hydration, better conservation |
| Pastry | Improved resistance and texture |
| Hydrolysis substrate, malto-dextrine production | Shorter hydrolysis times, fat substitutes, emulsion stabilizers |
| Fermentation substrate | Increased fermentation = > Better yield during production of biomass = > Production of metabolites |

Therefore, the invention also relates to the use of BOW-HT flours as an ingredient, particularly as a substitute product for untreated flours and/or native starches and/or modified starches, for manufacturing food products, and particularly for the production of snacks and other extruded products, panification and croissants and buns, pork butchery products, animal feed, sauces and cooked dishes, dairy products and the like.

As shown in Table 3 below, BOW-HT flours according to the invention can be used to produce:

snacks and other extruded products with an improved expansion, melting, organoleptic perception, panification and croissants and buns with improved aeration, improved hydration and better conservation;

pork butchery products and animal feed with improved resistance and texture, which is an advantage for sterilization treatments. Note also the better water retention and the increased technological yield;

sauces, cooked dishes, dairy and desert products for which it is possible to achieve the same functions such as resistance to technological constraints (freeze/thaw cycles, shear, acidity and heat treatment) as are possible with modified starch, while being able to declare the contents as an "INGREDIENT", for a slight additional dose of flour. With this product, there is no retrogradation and no syneresis, while there is an improvement in the texture and the organoleptic perception.

BOW-HT flours and/or starches can also be used for:

Hydrolysis substrate (chemical or enzymatic) for the production of malto-dextrines, since by offering the advantage of their shorter hydrolysis time, they can improve the efficiency of production of malto-dextrines by conferring a non-retrograding nature on them. For example, the resulting malto-dextrines can be used for the production of glues for which the viscosity can then be maintained over time due to non-degradation. The malto-dextrines thus obtained can also be used as a fat substitute in food products, for example, mayonnaises. In fact, despite the hydrolysis, malto-dextrines derived from traditional wheat always have the disadvantage that they retrograde, causing a gradual increase in the viscosity during storage, modifying the texture and appearance of the product. However, malto-dextrines derived from hydrolysis of BOW-HT flours and/or starch all overcome these problems and participate in stabilization of the emulsion.

Fermentation substrate in production of the culture medium, for a better biomass production yield.

Fermentation substrate in production of a culture medium for better production efficiency and specific metabolites, for example lactic acid, acetic acid, etc. Surprisingly, BOW-HT flours and/or starches used as a substrate encourage the growth of micro-organisms (bacteria, yeast) and can improve the productivity of specific metabolites.

In particular, the invention envisages the use of a BOW-HT flour or starch or a mix of BOW-HT flours and starches to make snacks and other extruded products, food products for biscuit making, for use in making bread, croissants and buns, pork butchery, animal feed, cooked sauces and cooked dishes, dairy products, batters and non-food products such as glues, paint, cosmetic products. The invention also considers the use of a BOW-HT flour or starch, or a mix of BOW-HT flour and starch, particularly as a hydrolysis substrate or as a fermentation substrate.

Therefore, another use for the invention is in food products such as snacks and other extruded products, food products for biscuit making, for use in making bread, croissants and buns, pork butchery, animal feed, cooked sauces and cooked dishes, containing a BOW-HT flour or starch according to the invention.

Yet another use of the invention is in non-food products such as culture media for micro-organism, glues, paint, cosmetic products containing a BOW-HT flour and/or starch according to the invention.

Thus, the use of a BOW-HT flour and/or BOW-HT starch can give a sauce with a viscosity comparable with that obtained with modified starches (cross linked and stabilized). For example, a white cream sauce prepared from BOW-HT flour has a non retrograded, smooth homogeneous fluid texture with no syneresis. The use of this type of flour guarantees perfect reproducibility of the sauces made and maintains the authenticity of a traditionally home made white cream sauce made using wheat flour. Furthermore, for the same functions as can be obtained with a modified starch, the BOW-HT flour can be declared as an "Ingredient" rather than an "additive", which is a very important criterion to consumers.

The invention also relates to a device for carrying out heat/moisture treatment and drying steps, that comprises:
- a cooker composed of a substantially horizontal cylinder in which a horizontal stirring blade keeps the product in contact with the walls by centrifuging, and capable of receiving water and/or steam;
- a dryer composed of a horizontal cylinder in which a horizontal stirring blade keeps the product in contact with the walls by centrifuging and into which air heated through a heat exchanger is injected;
- a circuit such as a thermal oil circuit that heats cylinders through a coaxial blanket.

EXAMPLE NO. 1

Full Waxy Wheat Flours and Starches

A full waxy wheat flour was obtained by using a cylindrical mill to grind full waxy wheat grains obtained by crossing aabbDD wheat with an IKE variety and a line with the AABBdd allele of the Bai Huo variety. It had the following characteristics:

Humidity: 13%
Protein (%/dry matter): 15.4%

The viscosimetric profile of this flour or extracted starch measured with RVA (4 g at 14% $H_2O$+24.5 ml of water) were as follows:

RVA Results

|  | Gelatinization start temperature ° C. | RVU peak | RVU viscosity drop | RVU final viscosity |
|---|---|---|---|---|
| Full waxy wheat flour | 66.15 | 284 | 177 | 138 |
| Starch extracted from full waxy wheat | 65.3 | 351 | 224 | 157 |

FIG. 1 shows the RVa viscosity for full waxy wheat flour and starch.

DSC Results

The lack of a second peak, normally observed for traditional wheat flour, confirms that there is no amylose.

Figure 2:
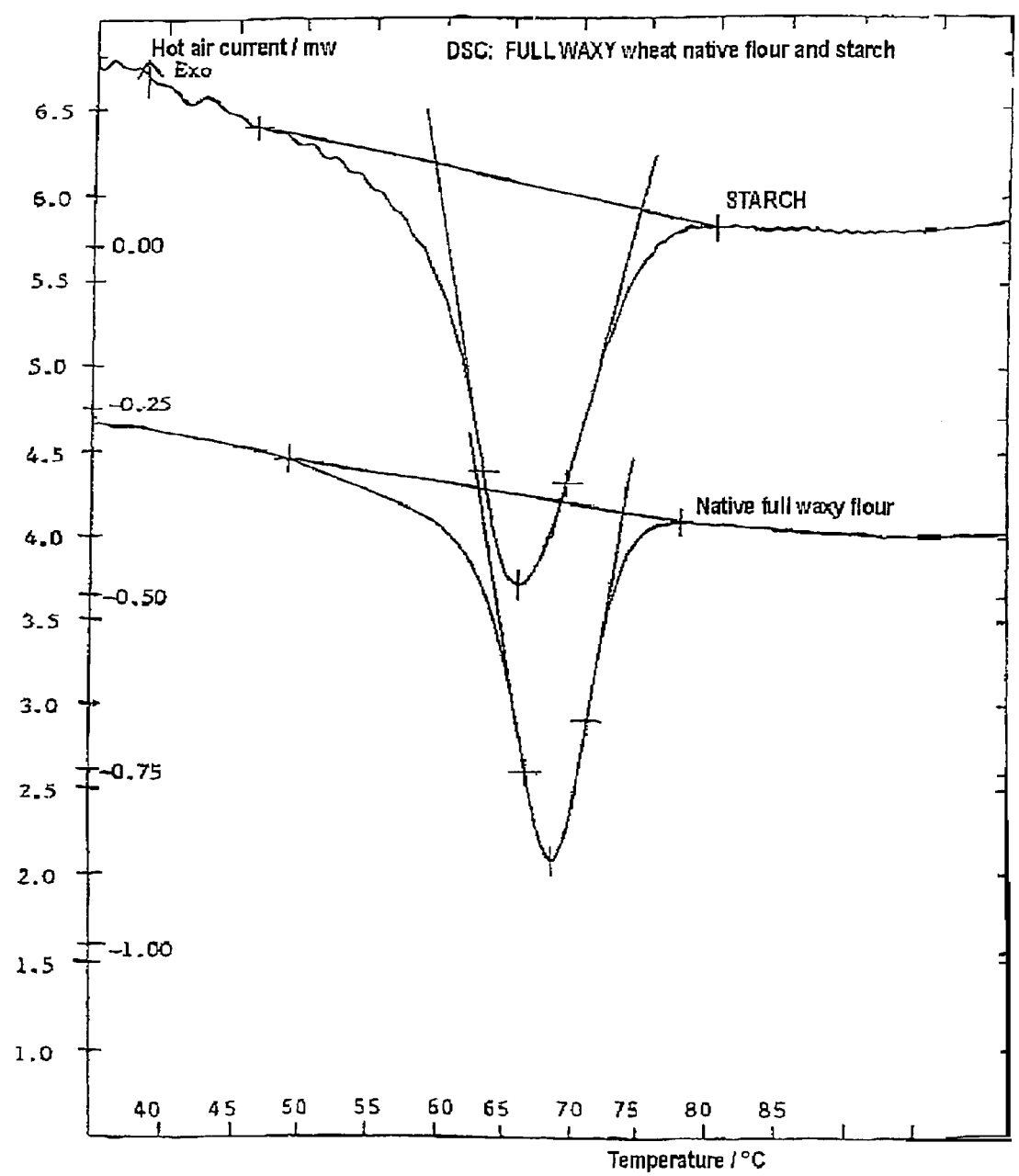
FIG. 2 is a graph showing the DSC curves for full waxy wheat flour and starch.

FIG. 2 shows the DSC results for full waxy wheat flour and starch.

Amylose Analysis (Blue Value)

The content of amylose is determined using the "blue value" method: Iodine determination of amylose content referenced by Batey Ian et al., Starch/Stärker 48 (1996), No. 9, p. 338-344. The amylose content for full waxy wheat starch and flour is equal to 0% (measured against the dry matter). The tolerance of this method is +/−1%.

EXAMPLE NO. 2

Full Waxy Wheat Flour as Fermentaion Substrate

Solutions composed of 30% flour (firstly normal wheat flour and secondly full waxy wheat) were seeded at $1\times10^7$ UGC/g with a *Lb. Plantarum* and a *Ln. Mesenteroides*, to represent a population composed of a homofermentation and heterofermentation stock. Fermentation lasted for 24 h and was monitored with time, the total flora content being determined after 24 hours. The results were as follows:

Bacterial Growth

|  | Lactic bacteria |
|---|---|
| Full waxy wheat flour | $1.6 \times 10^8$ |
| Normal wheat flour | $<1.10^7$ | pH Monitoring

| Time in hours | 2 h | 4 h | 6 h | 8 h | 24 h |
|---|---|---|---|---|---|
| Full waxy wheat flour | 5.84 | 5.93 | 4.97 | 4.42 | 3.49 |
| Normal wheat flour | 5.9 | 5.96 | 5.18 | 4.29 | 3.67 |

Monitoring Titratable Acidity (TTA) with Time

| Time in hours | 2 h | 4 h | 6 h | 8 h | 24 h |
|---|---|---|---|---|---|
| Full waxy wheat flour | 49.2 | 41 | 54.9 | 76.5 | 295.1 |
| Normal wheat flour | 15.2 | 21.2 | 36.4 | 60.6 | 278.8 |

The results obtained show that the use of a full waxy wheat flour can very significantly increase the bacterial growth and the final value of acid production, and can reduce the final pH value. Consequently, the use of the full

|  | Peak 1 | | | Peak 2 (amylose-lipid complex) | | |
|---|---|---|---|---|---|---|
|  | Starch state change T ° C. | Peak temperature ° C. | Enthalpy J/g | Onset point | Peak temp. | Enthalpy J/g |
| Full waxy flour | 62.86 | 68.54 | 10.2 | No amylose | | |
| Full waxy starch | 59.27 | 65.93 | 12.98 | No amylose | | | waxy flour can improve the productivity of specific metabolites (for example lactic acid, acetic acid, etc.) and encourages bacterial growth.

EXAMPLE NO. 3

Obtaining a BOW-HT Flour and Comparative Results

Choice of the flour derived from a full waxy wheat variety according to Example 1.

Heat treatment was used to modify and obtain the optimum crystalline structure. The parameters were shown in Table 4 below.

TABLE 4

| cooker temperature | 200 to 250° C. |
|---|---|
| material flow | 100 kg/h |
| % water/material flow | 8% |
| dryer temperature | 200 to 220° C. |

The flour obtained was ground and/or sieved, preferably to 250μ, to limit the granular perception in the mouth.

The BOW-HT flour thus obtained had the following characteristics:
humidity: between 4 and 12%
size grading close to 150 μ
RVA Comparative Results The viscosimetric profiles of native full waxy wheat flour and BOW-HT flour measured at RVA (4 g at 14% $H_2O$+24.5 ml of water) were as follows:

| | Gelatinization start temperature ° C | RVU peak | RVU viscosity drop | RVU final viscosity |
|---|---|---|---|---|
| Native full waxy wheat flour | 66.15 | 284 | 177 | 138 |
| BFW-HT flour | 64.55 | 479 | 309 | 223 |

Figure 3:
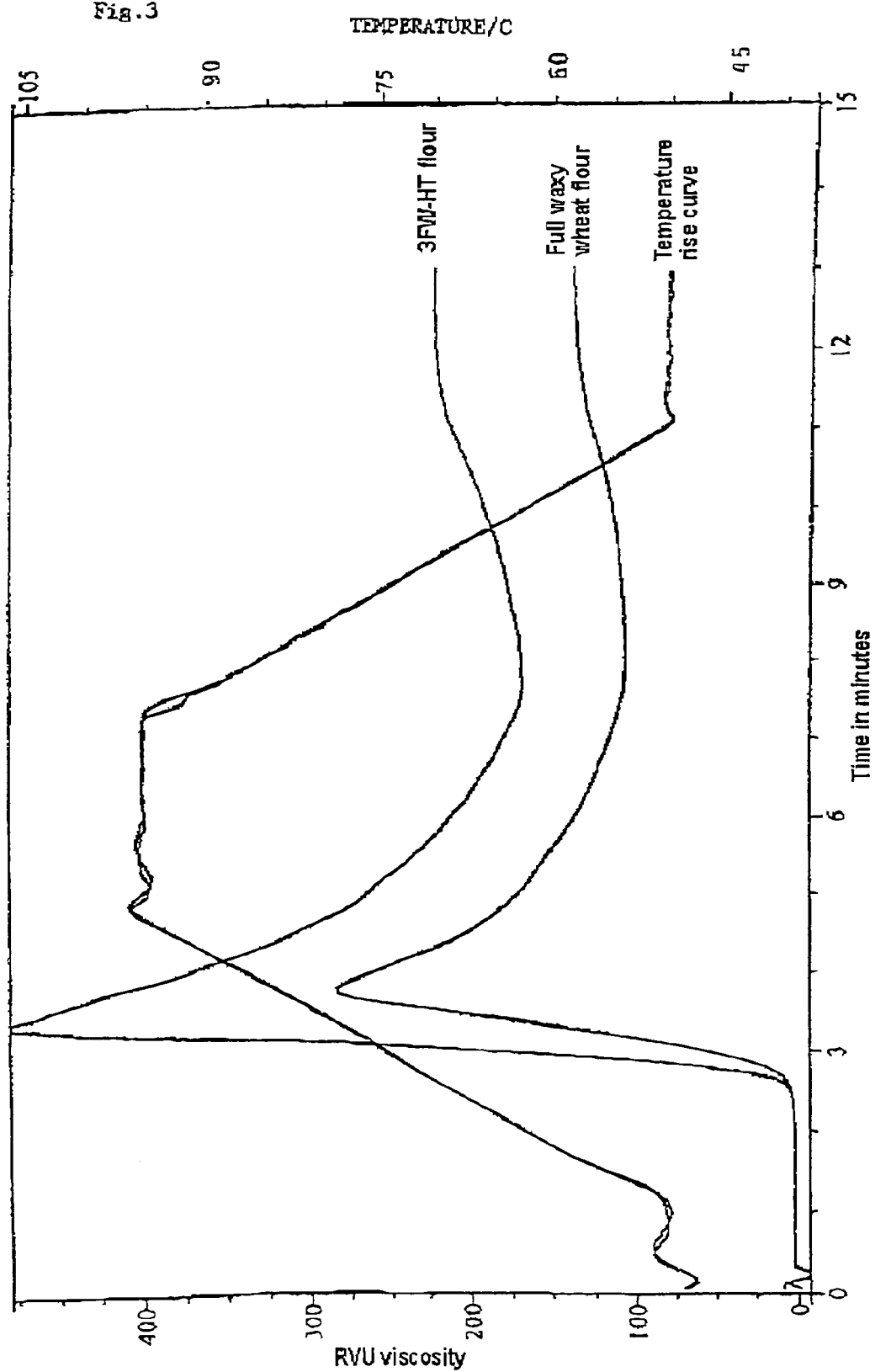
FIG. 3 is a graph showing the RVA viscosity curves for native full way wheat and BOW-HT flour.

FIG. 3 shows the RVA viscosity: native full waxy wheat flour and BOW-HT flour.

The development of the viscosity of HT flour is significantly greater than for native full waxy wheat flour. The viscosity gain is kept after the end of cooling so that it can be used as a highly functional ingredient.

RVA Comparative Results

Degree of Gelatinization

The degree of gelatinization is determined using the enthalpy ratios measured by DSC according to the publication by P. Chinachoti et al. (Journal of Food Science, vol. 55, No. 2, 1990, pages 543 and subsequent pages). The degree of gelatinization is calculated by DSC (Differential Scanning Colorimeter), the principle of which is based on a measurement of the energy of a change induced by a temperature variation. It is calculated using the following equation:

$$DG = 1 - \frac{\text{Enthalpy of heat treated product}}{\text{Enthalpy of native product}} \times 100$$

which is equal to $(1-(7.7/10.2))\times100=24.5\%$.

The examples shown below for use of the flour in Example No. 3 are chosen to illustrate the different uses and target markets that may contain BOW-HT flour and/or starch.

EXAMPLE NO. 4

Use of BOW-HT Flour for Snacks and Other Extruded Products

Snacks are made with the following formulas:

| | Snack according to the invention | Standard |
|---|---|---|
| Normal wheat flour | 67.5 | 97.5 |
| BFW-HT flour | 30 | — |
| Salt | 2 | 2 |
| Monoglyceride | 0.5 | 0.5 |

The mix is extruded on BC45 with a specific configuration for direct expansion (digressive step and counter fillet in final position) and cylindrical dies for the production of balls. The two mixes were extruded under the same conditions at temperatures of 100° C. The products were cut at the exit from the die. After cooling, the densities of the snacks were measured and the snacks tasted.

| | BFW-HT flour | Normal wheat flour |
|---|---|---|
| Density of snacks | 43 g/l +/− 2 | 55 g/l +/− 4 |
| Expansion level | higher | normal |

The results obtained show that the use of a BOW-HT flour used as a complement to a traditional flour can significantly

| | Peak 1 | | | Peak 2 (amylose-lipid complex) | | |
|---|---|---|---|---|---|---|
| | Starch state change T ° C. | Peak temperature ° C. | Enthalpy J/g | Onset point | Peak temp. | Enthalpy J/g |
| Full waxy wheat flour | 62.86 | 68.54 | 10.2 | No amylose | | |
| BFW-HT flour | 61.26 | 67.54 | 7.7 | No amylose | | |

The lack of the second peak normally observed for traditional wheat flour reveals the lack of amylose.

Figure 4:
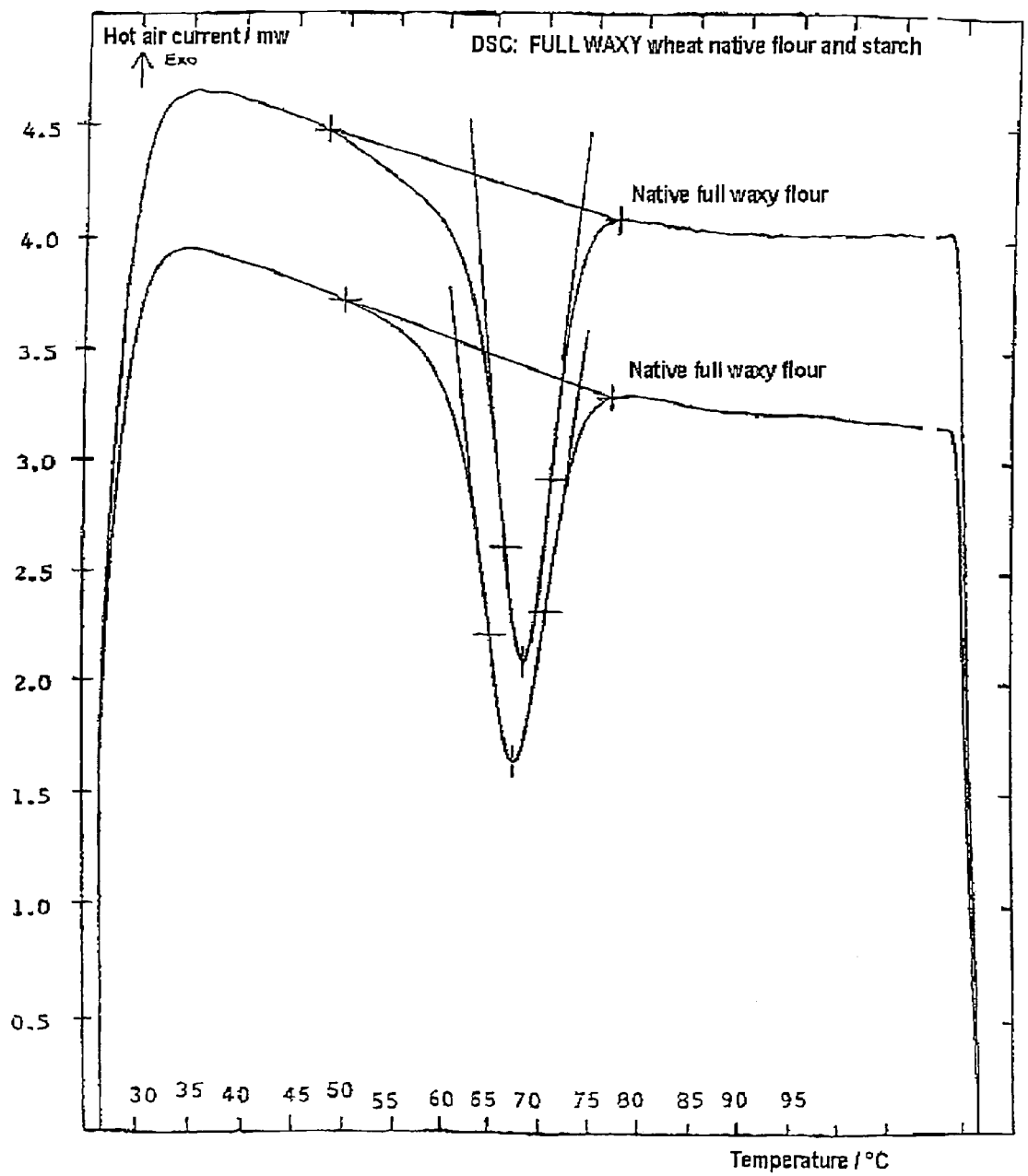
FIG. 4 is a graph showing the DSC curves for native full waxy wheat and for BOW-HT flour.

FIG. 4 represents DSC: native full waxy wheat flour and BOW-HT flour.

increase the degree of expansion. When used under these conditions at concentrations greater than 30%, its use is limited by an impression of stickiness in the mouth. In all cases, the degree of expansion is better.

EXAMPLE NO. 5

Pork Butchery Application

The following table contains a formulation of sausages for sterilized sauerkraut.

TABLE 5

|  | Control (in %) | Sausage according to the invention (in %) |
|---|---|---|
| mechanically separated pork meat | 10 | 10 |
| rind purée | 5 | 5 |
| production beef | 18 | 18 |
| pork knuckle | 12 | 12 |
| hard fat | 30 | 30 |
| ice | 19 | 19 |
| caseinates | 1 | 1 |
| salt with nitrite | 0.8 | 0.8 |
| phosphates | 0.3 | 0.3 |
| tradirose | 0.4 | 0.4 |
| spices | 0.5 | 0.5 |
| potato starch (control) | 3 | — |
| BFW-HT flour | — | 2 |

Dry ingredients and ice were incorporated into a large "cutter", in which the fat was gradually incorporated to create an emulsion. Ten cutter turns were necessary for conventional cutting of fine paste. The paste temperature was then close to 10° C. It was then pushed through a 22 mm Nojax casing and broken down into portions. The cooking step was carried out in several pre-cooking, smoking, cooking and sprinkling cycles.

The sausages were then put in sausage jars with sauerkraut with an acid pH (about 4) and then sterilized for 30 minutes at 115° C.

The sausages were evaluated at D+10 days based on emulsion resistance and technological efficiency criteria to determine the weight loss, the appearance and the texture in the mouth. Table 6 below contains the results of this evaluation.

TABLE 6

| Evaluation at D + 10 | Control | Sausage according to the invention |
|---|---|---|
| Emulsion production and resistance | = | = |
| Appearance | = | = |
| Yield after sterilization = (mass after − mass before)/mass before | 102 | 106 |
| Sensorial analysis |  |  |
| firmness to touch | 5/10 | 8/10 |
| firmness in mouth | 4/10 | 6/10 |

The efficiency after sterilization is not significantly different.

The use of BOW-HT flour, even at low concentrations, stabilizes the emulsion and ensures that the final viscosity of the sausage is exactly the same as the viscosity developed by a native starch. Furthermore, this BOW-HT flour gives better resistance to successive heat treatments (cooking+ sterilization) in a pour acid environment. The same efficiencies are obtained, but especially the BOW-HT flour provides improved firmness, which is the main quality criterion required for sausages with a fine paste. Furthermore, the use of a wheat-based ingredient does not add any color or parasite taste.

EXAMPLE NO. 6

Applications for Sauces and Cooked Dishes (Modified Starch Substitution)

Table 7 contains a "white cream sauce" formulation to be frozen.

TABLE 7

|  | Control (in %) | Sauce according to invention (in %) |
|---|---|---|
| modified starch: COLFLO - A1422 | 3 | — |
| BFW-HT flour | — | 4 |
| salt | 0.9 | 0.9 |
| butter | 3.4 | 3.4 |
| thick cream | 7.7 | 7.7 |
| water | 85 | 84 |

The dry ingredients were mixed and water then added with a whip. The mix was increased to boiling point using a heating mixer (a sauce boat type). The shear applied partially simulated the shear that occurs in industrial processes. Boiling was maintained for 5 minutes. Water was added to respect the formulation. The white cream sauce was put in a pot and stored at −18° C. Products were evaluated before and after a two-week freezing cycle. The evaluation was made based on viscosity criteria, the viscosity being measured using a rheometer (measurement of pour properties between 1 and 500 s-1 in 5 minutes with a Carimed CSL 100 with a 4 cm-4 degree cone and at a temperature of 40° C.) and by a sensorial analysis jury evaluating the texture in the mouth and the color. Table 8 below shows the results.

TABLE 8

|  | control | sauce according to the invention |
|---|---|---|
| Appearance |  | No retrogradation No syneresis |
| Viscosity (pour measurement - see curves) | = | = |
| Sensorial analysis Color texture in mouth | Translucid Homogeneous | White homogeneous, smooth |

Figure 5:
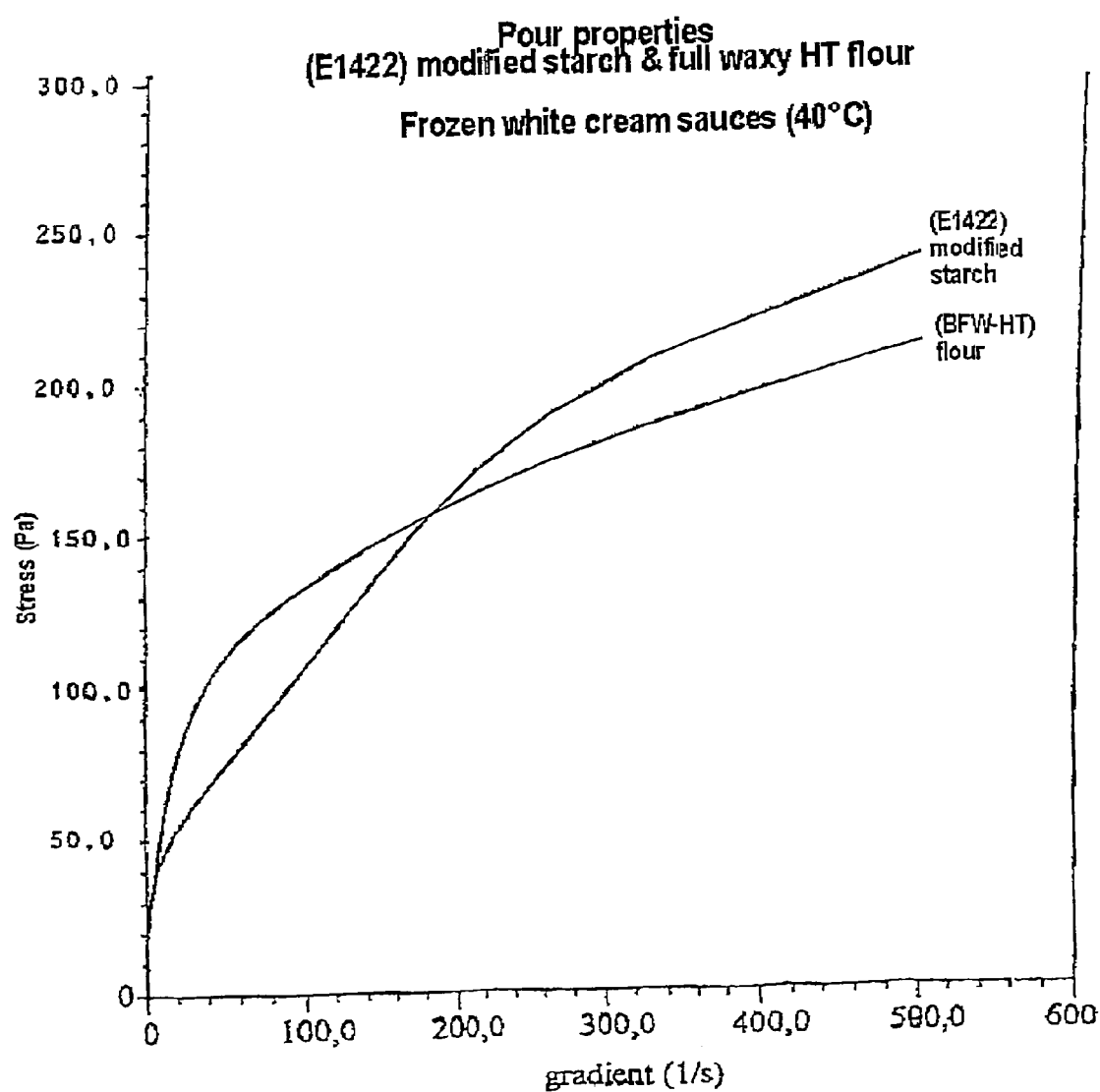
FIG. 5 is a graph showing curves of pour properties of modified starch (E1422) and BOW-HT flour for frozen white bream sauces.

FIG. 5 shows the pour properties: modified starch (E1422) and BOW-HT flour.

The use of BOW-HT. Flour provides a sauce with a viscosity comparable to the viscosity achieved with modified starch (cross linked and stabilized). The white cream sauce has a non-retrograded, homogeneous, smooth, syneresis free, fluid texture that resists freezing/thawing cycles. The use of this type of flour guarantees perfect reproducibility of sauces made and has the same authenticity as a home made white cream sauce made traditionally using wheat flour. Furthermore, for the same functions as a modified starch, BOW-HT flour can be declared as an "ingredient" and not an "additive", and this criterion is very important to consumers.

EXAMPLE 7

Application to Pasteurised Tomato Sauce

Table 9 below shows the formulation for a pasteurised tomato sauce.

TABLE 9

|  | Control (in %) | Sauce according to the invention (in %) |
| --- | --- | --- |
| Modified starch (Colflo 67 - E1422) | 3 | — |
| BFW-HT Flour | — | 4 |
| Salt | 0.9 | 0.9 |
| Tomato concentrate | 13.3 | 13.3 |
| Oil | 8.1 | 8.1 |
| Water | 74.7 | 73.7 |

The dry ingredients were mixed, and water and the tomato concentrate were then added with a whip. The temperature of the mix was increased to the boiling point using a heating mixer (sauce boat type). The resulting shear partly simulated the shear that occurs during industrial processes. Boiling was maintained for 5 minutes. Water was added to respect the formulation. Tomato sauce was put into a pot and pasteurized for 1 hour at 100° C. using a pasteurizer.

The products were evaluated after 7 days storage at 4° C. (acceleration of the retrogradation process) and after 1 month at ambient temperature. The evaluation was made based on viscosity criteria using a rheometer (measurement of pour properties between 1 and 500 s-1 in 5 minutes using a Carimed CSL 100 with a 4 cm-4 degree cone at a temperature of 40° C.) and by a sensorial analysis jury evaluating the texture in the mouth and color. The following table shows the results.

TABLE 10

|  | Control | Sauce according to the invention after 7 days at 4° C. | Sauce according to the invention after 1 month at ambient temperature |
| --- | --- | --- | --- |
| Appearance |  | No retrogradation Texture not jellified, very fluid |  |
| Stabilizing properties | Oil exudation at the surface | Emulsion stabilizer Very homogeneous |  |
| Viscosity (pour measurement - see curves) | = | = | = |
| Sensorial analysis |  |  |  |
| Color | Translucid | Slightly more opaque and lighter. | Slightly more opaque and lighter. |
| texture in mouth | Homogeneous | Homogeneous creamy | Homogeneous creamy |

Figure 6:
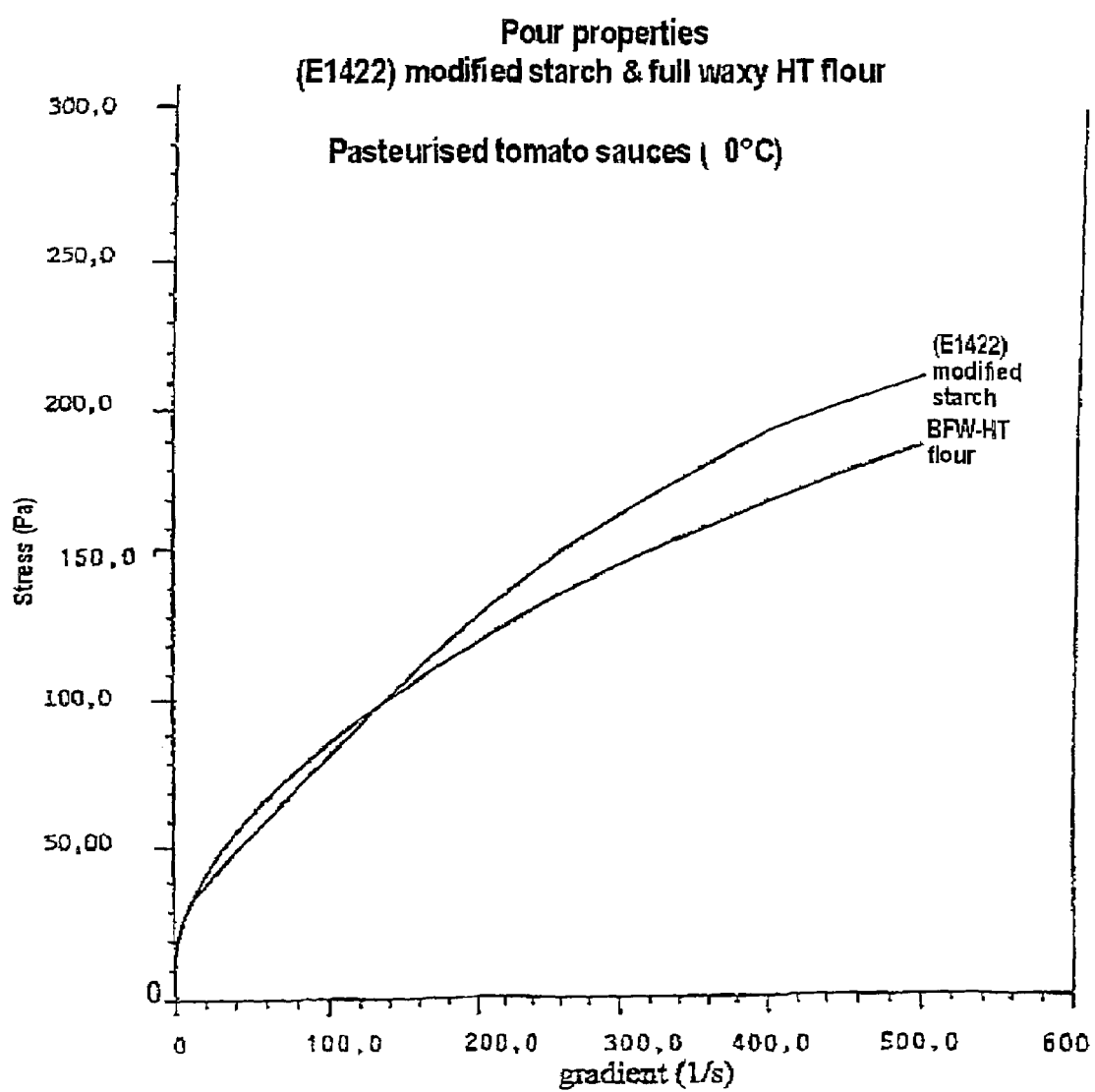
FIG. 6 is a graph showing the curves of pour properties for modified starch (E1422) and BOW-HT flour for pasteurized tomato sauces.

FIG. 6 shows pour properties for modified starch (E1422) and BOW-HT flour.

The use of BOW-HT flour can give a sauce with viscosity comparable to that made with modified starches (cross-linked and stabilised). The tomato sauce has a non-retrograded fluid texture that is smooth, homogeneous and syneresis free. The use of this type of flour under acid conditions—pH=4) guarantees perfect reproducibility of the sauces made. Furthermore, BOW-HT flour, for the same functions as a modified starch, can be declared as an "Ingredient" rather than "additive", which is preferred by consumers. Since no oil release has been observed, the flour according to the invention is also a better means of stabilizing the emulsion than using modified starch, in a tomato sauce with pH=4. This example demonstrates a new function of this type of flour that was unknown in the past.

EXAMPLE 9

Application to Mushroom Soup

Table 11 below shows a formulation for mushroom soup.

TABLE 11

| BFW-HT flour | 6% |
| --- | --- |
| Water | 77.18% |
| Mushrooms cut into strips | 10% |
| Thick fresh cream | 2.5% |
| Mushroom concentrate | 2.25% |
| Powder cream | 1% |
| Sodium caseinates | 1% |
| Spices | 0.05% |
| Ground white pepper | 0.02% |

The dry ingredients were mixed with water and the mushroom concentrate was added. The mix was heated to 85° C. Fresh cream and mushrooms cut into strips were added. The soup was put in a pot and pasteurized for 1 hour at 120° C.

The pots were opened and the soup examined after one week kept at ambient temperature. It had a non-retrograded, homogeneous, smooth and syneresis free fluid texture, and after being heated, the taste and flavor was comparable to the taste and flavour of the freshly prepared soup.

For comparison, if BOW-HT flour is replaced by:
- traditional wheat flour, and after one week's storage under the same conditions, the soup was in the form of a solid gel that did not flow from the pots, the loss of fluidity being due to retrogradation of amylose.
- modified starch, after one week's storage under the same conditions, the soup had a fluid, homogeneous and smooth texture, but an unpleasant and undesirable after taste after being heated.

EXAMPLE 10

Applications to Cakes

Table 12 below shows a cake formulation.

TABLE 12

|  | Control | Cake according to the invention |
| --- | --- | --- |
| Normal wheat flour | 175 g | From 155 to 174 |
| BFW-HT flour | — | Complement for 175 g of flour total, namely 20 to 1 g |
| Sugar | 120 g | 120 g |
| Eggs | 80 g | 80 g |
| Milk | 60 g | 60 g |
| Butter | 100 g | 100 g |

Butter and sugar were mixed to make a cream into which the eggs are added. The mix was beaten before adding flour and milk. 400 g of the paste obtained was poured into a 20 cm diameter cake mould and put into the oven at 180° C. for 25 minutes.

The use of an BOW-HT flour was sufficient to gain 1 to 3 hydration points. The cake kept its shape after cooking and when cooled, did not deflate and was smoother, this texture being conserved with time.

For comparison, a prepared mix made from traditional wheat flour and cooked under the same conditions gives a cake that collapses after baking and does not keep its shape, and becomes dry and less smooth with time.

The invention claimed is:

1. A process for preparing a functional full waxy wheat flour comprising:
   preparing an initial flour with a defined size grading starting from full waxy wheat grains; and
   subjecting said flour to a heat-moisture treatment including adding water or steam and heat energy for less than about 5 minutes to achieve a degree of gelatinization of starch between about 20% and about 80%.

2. A flour obtained by the process according to claim 1.

3. A food product containing a flour according to claim 2.

4. Products selected from the group consisting of snacks and extruded items, biscuits, components for making bread, croissants and buns, pork butchery items, animal feed, sauces and cooked dishes, dairy items, batters, glues, paint and cosmetic products containing a flour according to claim 2.

* * * * *